3,506,724
PREPARATION OF ORTHO- AND
PARA-NITROPHENOLS
William B. Tuemmler and Seymour M. Linder, Catonsville, Md., assignors to FMC Corporation, New York, N.Y., a corporation of Delaware
No Drawing. Filed Sept. 23, 1966, Ser. No. 581,447
Int. Cl. C07c 79/22
U.S. Cl. 260—622
5 Claims

ABSTRACT OF THE DISCLOSURE

This specification discloses a method of producing the sodium salt of an ortho- or para-nitrophenol by hydrolyzing the corresponding nitrochloroaromatic compound with caustic soda in dimethyl sulfoxide as solvent, at a temperature between 80–115° C., while blowing an oxygen-containing gas through the reaction mixture in sufficient quantity to inhibit tar formation.

---

This application deals with the preparation of ortho- and para-nitrophenols by the alkaline hydrolysis of 1,2- and 1,4-nitrochloroaromatic compounds to the corresponding phenol sodium salts, and aims to provide a method characterized by high yields of product, ease of operation, and the production of product in form suitable for further reaction, without the necessity for isolation thereof. Specifically, this invention relates to the alkaline hydrolysis of 1,2- and 1,4-nitrochloroaromatic compounds by treating with caustic alkali in dimethyl sulfoxide at temperatures of about 80–115° C., while blowing air through the reaction mixture during the hydrolysis.

Nitrophenols are valuable intermediates for the production of a wide variety of organic compounds, being useful, for example, in the synthesis of certain insecticides as described in United States patent application Ser. No. 436,279, filed Mar. 1, 1965, in the production of parathions, and for the production of aminophenols which are useful as dye intermediates.

One of the standard techniques for making nitrophenols is the alkaline hydrolysis of nitrochloroaromatic compounds. When the chlorine is in the ortho- or para-position to the nitro group, the hydrolysis proceeds fairly smoothly to the corresponding sodium salt. However, the process is complicated, as most organic processes are, by the formation of undesirable by-products; for example, the nitro group can be converted to an azoxy group, and tars can be formed. Moreover, the nitrophenol generally must be isolated and purified, because the impurities interfere with further reactions, and tend to build up in the system.

Dimethyl sulfoxide is a very useful solvent for the reaction, since it can be used as the carrier for the nitrophenol in further reactions; for example, the reaction of sodium nitrophenoxide with the methallyl chloride to produce a nitrophenyl methallyl ether. Unfortunately, when the dimethyl sulfoxide from such a reaction is recycled back to the hydrolysis reaction, without extensive and expensive purification, very large quantities of high-boiling tarry materials are formed during the subsequent hydrolysis.

This invention has as its object a method for hydrolyzing 1,2- and 1,4-nitrochloroaromatic compounds to the corresponding phenol sodium salts in high yield without the production of substantial amounts of by-products, and under such conditions that the recovered dimethyl sulfoxide can be used in a subsequent hydrolysis without previous extensive purification, to produce a reaction mixture which can be use directly, without isolation of product, in further process steps.

According to the present invention, 1,2- and 1,4-nitrochloroaromatic compounds are hydrolyzed with caustic soda using dimethyl sulfoxide (DMSO) as the solvent at temperatures of about 80–115° C., and preferably at 100–110° C., while air is blown through the reaction mixture. The resultant solution of sodium nitrophenolate can be used directly in such reactions as alkylation with, for example, methallyl chloride, and the dimethyl sulfoxide recovered from the further processing can be recycled to the hydrolysis, after simple distillation, without causing tar formation.

In general, about 0.95 to 1.05 moles of the nitrochloroaromatic compound is dissolved in DMSO and the mixture is heated to the desired reaction temperature (80–115° C.) with good agitation. The solution is preferably as concentrated as possible considering the necessity for keeping all of the reactants in solution for further processing. About 220 grams of DMSO per gram mole of nitrochlorobenzene makes a good solution. A stream of air is sparged through the mixture at a rate of 1 to 500 ml., and preferably between 75 and 150 ml. of a minute per mole of product, and 50 percent sodium hydroxide solution containing two moles of sodium hydroxide is added over a period of about an hour. The temperature is then raised slightly for long enough to complete the reaction. When the hydrolysis is complete, the free caustic in the mixture is neutralized, preferably by using an excess of sodium bicarbonate, which is used because it neutralizes free caustic without the possibility of converting the sodium phenolate to free phenol, and the water is then removed by fractionation in vacuo at a pressure of about 300 mm. of mercury. The resultant solution of sodium nitrophenoxide in DSMO can then be reacted further as desired.

In order to minimize tar formation, the reaction should be run under such conditions as to avoid iron contamination.

Any material of construction which resists strong caustic may be used, for example, stainless steel, nickel, and the like.

The caustic used should be rayon-grade, low in iron, and the material should be filtered before use to remove rust. The caustic soda used in the process is generally handled as a fifty percent aqueous solution. More concentrated solutions can be used, but they cause increased handling problems. Less concentrated solutions can also be used, but they lead to longer reaction times and poor volume productivity relationships.

High temperatures also favor tar formation and should be avoided. At 120° C., six percent of tar is formed even with air blowing, so that temperatures above 115° C. are undesirable. Since the alkali precipitates out of solution at about 80° C., the operative range is 80–115° C. Because the operation proceeds faster at high temperatures, the preferred temperature range is 100–110° C.

While freshly prepared DMSO gives relatively little tar formation, recovered DMSO, even if extensively purified by fractional distillation, tends to produce substantial quantities of tar. Without the air blowing used in accordance with our invention, traces of impurities which can hardly be detected analytically are sufficient to form five percent or more of tar. Tar left in the reactor from previous runs will cause this increased tar formation in subsequent runs, and a very large number of potential impurities of DMSO will produce the same results in the absence of the air blowing. Typical impurities which cause tar formation are methallyl chloride, isocrotyl chloride, methallyl alcohol, methallyl formate, o-nitrophenyl methallyl ether, dimethyl sulfide, dimethyl sulfone, and formaldehyde.

As indicated above, the minimum quantity of solvent used in the reaction is determined by the solubility of the phenol salt at reaction temperature, and preferably a slight margin of safety is provided. However, larger quantities of solvent have no advantage, since they decrease the volume productivity.

Theoretically, the reaction requires two moles of caustic soda per mole of the phenol. Preferably, either a slight excess of caustic or of the nitrochlorobenzene is used. The preferred range is 0.95 to 1.05 moles; however, anything in the range of 0.5 to 1.5 moles is operative. With the nitrochlorobenzenes, about 200 g. of DMSO is needed for solution with a mole of product, and we prefer to use 200 to 250 grams, although we can use up to 1000 grams, or even more.

The quantity of air needed depends on the amount of impurities present in the DMSO, the rate of agitation of the reaction mixture, and the reaction pressure. More air is needed when a high level of impurities is present. Higher pressures decrease the amount of air needed, since they increase the oxygen solubility. The amount of air needed is lowered with greater agitation since it makes more air available in the reaction. However, the operative ranges are very wide; for example, we can operate from the reduced pressures as low as 0.1 of an atmosphere to pressure as high as 100 atmospheres or more, although the preferred range is from 1 to 10 atmospheres. We especially prefer to operate under slight pressure, of the order of 40 p.s.i.g.

The air sparged through the reaction mixture may be recirculated provided the oxygen consumed is replenished. We prefer to use air diluted with nitrogen to five percent oxygen, to reduce explosion hazards. Under these conditions, we recirculate the diluted air, adding fresh air to the recirculating stream to replenish the oxygen consumed.

The operating range of air needed, with or without recirculation, is 1 to 500 ml. per minute of air per mole of product. The preferred range is about 15 to 150 ml. per minute of air at atmospheric pressure and 1 to 100 ml. per minute of air per mole of product under 45 p.s.i.g. pressure.

After the reaction is complete, it is usually necessary to neutralize the unconsumed sodium hydroxide, if the product is to be used without isolation. This can be done with any acid using potentiometric titration, using exactly enough acid to neutralize free caustic. The use of sodium bicarbonate bypasses this control, since it can be used in excess without disturbing the product.

The following typical examples of the invention are given by way of illustration, and not by way of limitation of the invention.

EXAMPLE 1

The equipment consisted of a one-liter resin flask equipped with a stainless steel coil, a mechanical stirrer fitted with a Teflon turbine-type agitator, thermometer, condenser, addition funnel, and a coarse fritted glass sparge tube which extended below the level of the reaction mixture. The temperature was controlled automatically by a Thermo-Watch temperature regulator connected to two solenoid valves which controlled the flow of steam and air to the coil. The rate of air flow was measured with a rotameter.

A mixture of 157.5 grams of o-nitrochlorobenzene and 220.0 grams of recovered DMSO was charged to the reactor. (The recovered DMSO was obtained by one-plate distillation from a previous preparation in which the sodium o-nitrophenoxide was reacted with methallyl chloride to form o-nitrophenyl methallyl ether.) The mixture was heated to 100° C. with stirring while sparging with air at a rate of 150 ml. per minute. A solution of 168 grams of 50 percent sodium hydroxide was added from the addition funnel over a period of one hour. The reaction mixture was then heated at 100° C. for an additional three hours, then diluted with water and acidified with concentrated hydrochloric acid. The liberated phenol was extracted with chloroform and the chloroform washed with water. After removal of the solvent, a sample of the phenol was distilled in vacuo at 0.1 mm. Hg pressure up to a pot temperature of 130° C., and found to contain 2.35 percent tar.

When the above example was repeated without air blowing in the reaction mixture, the product contained 13.7 percent tar. When nitrogen was used in place of the air, the product contained 13.75 percent tar.

EXAMPLE 2

Example 1 was repeated, reducing the air sparge rate to 16 ml. per minute. The product contained 2.27 percent tar, indicating that the air sparge rate can be varied over a wide range.

EXAMPLES A TO G

These examples illustrate some of the factors which induce tar formation.

Example A.—A 12-liter round bottom resin flask was equipped as described in Example 1 with the exception of the sparge tube which was omitted. The mixture was stirred with a Teflon paddle. A mixture of 1891 grams of ortho-nitrochlorobenzene and 2640 grams of virgin DSMO was charged to the flask, the mixture was heated to 100° C. and 2015 grams of 49.05 percent sodium hydroxide solution was added over a period of one hour. After heating for an additional three hours, the mixture was dehydrated and reacted with methallyl chloride. The final product, ortho-nitrophenyl methallyl ether, contained 1.18 percent tar.

Example B.—A mixture of 157.5 grams of ortho-nitrochlorobenzene, 220 grams of virgin DSMO, and 2.8 grams of tar from a previous preparation of sodium o-nitrophenoxide was charged to the reactor described in Example 1, and the hydrolysis carried out in the usual manner but without air. The product sodium o-nitrophenoxide contained 15.07 percent tar.

Example C.—The experiment described in Example B was repeated using 1.0 grams of methallyl alcohol in place of the tar. The product contained 11 percent tar.

Example D.—The experiment described in Example B was repeated using 1.0 gram of residue obtained from the distillation of a sample of methallyl chloride (methallyl chloride dimer) in place of the tar. The product contained 7.5 percent tar.

Example E.—The experiment described in Example B was repeated using 1.0 gram of dimethyl sulfide in place of the tar. The product contained 13.0 percent tar.

It will be noted that when virgin DMSO is used, relatively little tar is formed (Example A), but when methallyl alcohol, methallyl chloride dimer, or dimethyl sulfide are added (Examples B–E), as would be the case with recycle DMSO, heavy tar formation occurs.

Example F.—The equipment consisted of a one-liter, three-necked flask equipped with a mechanical stirrer, thermometer, condenser, and addition funnel. A mixture of 157.5 grams of o-nitrochlorobenzene, 220 grams of virgin DMSO, and 10 grams of o-nitrophenyl methallyl ether was charged to the flask, the mixture heated to 100° C. by means of a heating mantle, and the hydrolysis carried out in the usual manner. The tar determination was carried out at 100–115° C./0.7 mm. under which conditions the o-nitrophenyl methallyl ether would not distill. Correcting for this material, the product was found to contain 10.8 percent tar.

Example G.—Air blowing the recovered DMSO before hydrolysis does not produce the desired result. When Example B was repeated using DMSO recovered from previous operations of o-nitrophenyl methallyl ether which was air blown at a rate of 75 ml. per minute for eight hours on a steam bath, a product was obtained containing 12.35 percent tar.

EXAMPLE 3

The equipment consisted of a four-liter cylindrical glass resin flask with a stainless steel turbine-type stirrer, stuffing box, four baffles, coil, sparge tube, a glass thermometer, condenser, and addition funnel. The mixture was stirred with a constant speed electric motor. The reactor was charged with 880 grams of DMSO, recovered from a previous preparation of o-nitrophenyl methallyl ether, and 661.6 grams of o-nitrochlorobenzene, heated to 100° C., and 640 grams of 50 percent sodium hydroxide solution was added over a period of one hour. Then the mixture was heated at 110° C. for an additional five hours. The relationship between stirrer speeds, air sparge rates, and tar contents of the products is given below.

| Stirrer Speed, r.p.m. | Air Sparge Rate, ml./min. | Non-volatile Residue, Percent |
|---|---|---|
| 650 | 300 | 4.25 |
| 1,040 | 300 | 2.12 |
| 1,300 | 300 | 1.09 |
| 650 | 600 | 1.95 |
| 1,040 | 600 | 0.88 |

Obviously it is essential to get the oxygen to the product, either by rapid stirring or by increase of the air sparge rate.

EXAMPLE 4

When Example 3 was repeated without air sparging, the product contained 6.3 percent tar.

EXAMPLE 5

This example illustrates that the five percent oxygen mixture used for sparging can be recycled provided that the oxygen consumed is made up. The equipment was similar to that used in Example 3 with added rotameters. A pump was used to recycle the exit gases. A five-liter flask placed in the recycle line served as a reservoir. The reactor was charged with 661.6 grams of o-nitrochlorobenzene and 880 grams of distilled recovered DMSO. The mixture was heated to 100° C. while sparging with a mixture of 300 ml./minute of air and 900 ml./minute of nitrogen. The alkali addition (640 grams of 50 percent sodium hydroxide solution) was started and after 15 minutes the exit gases were recycled at a rate of 1200 ml./minute. These gases contained 2.9 percent oxygen, as determined by gas chromatography. A make-up stream of air was mixed with the recycle gases to increase the oxygen content of the mixture. After 30 minutes, the oxygen concentration of the recycle gases dropped to 1.4 percent. The stream of make-up air was increased and the oxygen concentration of the recycle gases gradually increased and remained constant at 5–6 percent. When the alkali addition was complete, the temperature was increased to 110° C. as in the previous examples. The product contained 1.48 percent tar.

EXAMPLE 6

This example illustrates a pressure reaction. The equipment consisted of a one-gallon high-pressure stainless steel autoclave equipped with a turbine-type stirrer, air sparge tube, thermowell, coils, a pressure regulator control valve on the exit line, and a pump for the alkali addition. The reactor was charged with 880 grams of distilled recovered DMSO and 661.6 grams of o-nitrochlorobenzene, and the mixture was heated to 100° C. while sparging with a mixture of about one part air and three parts of nitrogen at a rate of about 300 ml./minute and a pressure of 45 p.s.i.g. The rate of stirring was 675 to 700 r.p.m. The alkali (640 grams of 50 percent sodium hydroxide) was pumped in over a period of about 15 minutes. The temperature was held at 100° C. for an additional 45 minutes, then raised to 110° for five hours. The product, after working up, was found to contain 0.76 percent tar.

EXAMPLE 7

This example illustrates hydrolysis under pressure under an atmosphere of five percent oxygen, using as sparge a sufficient quantity of air to make up the oxygen consumed in the process. The equipment and charge were the same as in Example 6. The reactor, after charging, was pressurized to 45 p.s.i.g. with nitrogen, thus converting the gas in the autoclave to five percent oxygen. The air sparge rate was started at 70 ml./minute during the first hour and gradually decreased to 10 ml./minute at the end of the reaction so as to maintain a concentration of approximately 5 percent oxygen as determined by analysis of the effluent gas by gas chromatography. The product contained 0.66 percent tar.

EXAMPLE 8

The equipment was similar to that used in Example 1. A mixture of 165.4 grams of p-nitrochlorobenzene and 220 grams of dimethyl sulfoxide (recovered from the preparation of o-nitrophenylmethallyl ether) was charged to the reactor and the mixture heated to 100° C. with stirring while sparging with air at a rate of 75 ml./minute. A solution of 160 grams of 50 percent sodium hydroxide was added from the addition funnel over a period of one hour. The reaction mixture was then heated to 110° C. for an additional nine hours. The phenol was then isolated as described in Example 1. Tar determination was conducted by distillation in vacuo at 0.1 mm. Hg pressure up to a pot temperature of 175° C. The product contained 3.05 percent tar.

EXAMPLE 9

When the above example was conducted without air blowing the reaction mixture, the product contained 20.5 percent tar.

Obviously, the examples can be multiplied indefinitely without departing from the spirit of the invention which is defined in the claims.

What is claimed is:

1. The method of producing the sodium salt of an ortho- or para-nitrophenol which consists in hydrolyzing the corresponding nitrochloroaromatic compound with caustic soda in recovered dimethyl sulfoxide as solvent, at a temperature between 80–115° C. while blowing an oxygen-containing gas through the reaction mixture at the rate of between 1 and 500 ml. a minute per mole of product wherein the recovered dimethyl sulfoxide solvent is obtained from a previous hydrolysis of a nitrochloroaromatic compound with caustic soda to form the corresponding sodium salt.

2. The method of claim 1 in which the temperature is maintained between 100–110° C.

3. The method of claim 1 in which the oxygen-containing gas is diluted with insert gas, whereby the explosion hazard is minimized.

4. The method of claim 1 in which the material being hydrolyzed is 1,2-nitrochlorobenzene.

5. The method of claim 1 in which the material being hydrolyzed is 1,4-nitrochlorobenzene.

References Cited

UNITED STATES PATENTS

| 2,196,580 | 1/1938 | Smith et al. | 260—629 |
| 2,126,648 | 9/1938 | Lofton et al. | 260—629 |
| 2,615,923 | 10/1952 | Henrich | 260—629 |
| 3,283,011 | 11/1966 | Cox | 260—622 |

OTHER REFERENCES

Roberts, "Chem. Abs.," vol. 61, page 937.

Tommita et al., Acta Chemical Scandinavica, vol. 20, pp. 937–945, Sept. 12, 1966.

BERNARD HELFIN, Primary Examiner

W. B. LONE, Assistant Examiner

UNITED STATES PATENT OFFICE
CERTIFICATE OF CORRECTION

Patent No. 3,506,724        Dated April 14, 1970

Inventor(s) William B. Tuemmler and Seymour M. Linder

It is certified that error appears in the above-identified patent and that said Letters Patent are hereby corrected as shown below:

Column 2, line 21, "of" should be deleted in patent.

Column 2, line 51, "above 115°C" should read --above about 115°C--.

Column 2, line 65, "results" should read --result--.

Column 4, line 35, "DSMO" should read --DMSO--.

Column 5, line 3, "flask with a" should read --flask equipped with a--.

Column 6, line 32, "example 9" should read --example H--.

Column 6, line 54, "insert" should read --inert--.

Signed and sealed this 7th day of March 1972.

(SEAL)
Attest:

EDWARD M. FLETCHER, JR.
Attesting Officer

ROBERT GOTTSCHALK
Commissioner of Patents